United States Patent
Morndal et al.

(10) Patent No.: US 7,036,185 B2
(45) Date of Patent: May 2, 2006

(54) ARRANGEMENT IN A WHEEL LIFTING MECHANISM

(75) Inventors: Staffan Morndal, Linkoping (SE); Bjorn Karlsson, Linkoping (SE); Adam Dahlquist, Linkoping (SE)

(73) Assignee: Enkatsu Solutions AB, Linköping (SE)

( * ) Notice: Subject to any disclaimer, the term of this patent is extended or adjusted under 35 U.S.C. 154(b) by 0 days.

(21) Appl. No.: 10/504,391

(22) PCT Filed: Feb. 14, 2003

(86) PCT No.: PCT/SE03/00243

§ 371 (c)(1),
(2), (4) Date: Aug. 9, 2004

(87) PCT Pub. No.: WO03/068580

PCT Pub. Date: Aug. 21, 2003

(65) Prior Publication Data

US 2005/0189732 A1    Sep. 1, 2005

(30) Foreign Application Priority Data

Feb. 15, 2002    (SE) .................................... 0200444

(51) Int. Cl.
*B60B 33/00*    (2006.01)
(52) U.S. Cl. ............................... 16/18; 280/5.2; 280/43
(58) Field of Classification Search .................. 280/43, 280/5.2, 5.26, 5.28, 29, DIG. 10, 37, 11.222, 280/5.32; 304/4; 16/18 B, 18 R; 301/1, 301/5.1, 5.23

See application file for complete search history.

(56) References Cited

U.S. PATENT DOCUMENTS

| 2,123,707 A | * | 7/1938 | Bloch | ............................ | 16/44 |
| 3,239,872 A | * | 3/1966 | Kitrell | ........................ | 16/18 R |
| 4,432,425 A | * | 2/1984 | Nitzberg | ..................... | 180/8.2 |

(Continued)

FOREIGN PATENT DOCUMENTS

DE           40 40 283           8/1991

(Continued)

*Primary Examiner*—J. Allen Shriver
(74) *Attorney, Agent, or Firm*—Merchant & Gould P.C.

(57) ABSTRACT

The present invention relates to an arrangement in a wheel lifting mechanism designed to lift at least one wheel (1) running on an underlying surface so that it is capable of negotiating an obstacle (h) rising above the underlying surface. The arrangement comprises an element (7) which is formed with a contour convexly curved towards the underlying surface and is moveably supported in relation to the axle of the wheel (1). The said element is designed, when the contour of the element (7) engages with the obstacle (h), to bring about the said lifting of the wheel (7) as the element (7) is rotated about its point of engagement with the obstacle (h). The arrangement further comprises a chassis (4), to which the wheel axle is firmly connected. Between the chassis and the element (7) there is an operative connection designed, when the element (7) engages with the obstacle (h), to allow the chassis (4) firstly to undertake lifting of the wheel (1) from a home position of the element (7) during a displacing movement relative thereto in the direction of movement of the wheel, and secondly to bring about a return to the home position once the wheel (1) has been lifted to the level of the obstacle (h).

7 Claims, 5 Drawing Sheets

U.S. PATENT DOCUMENTS

Figure 1:
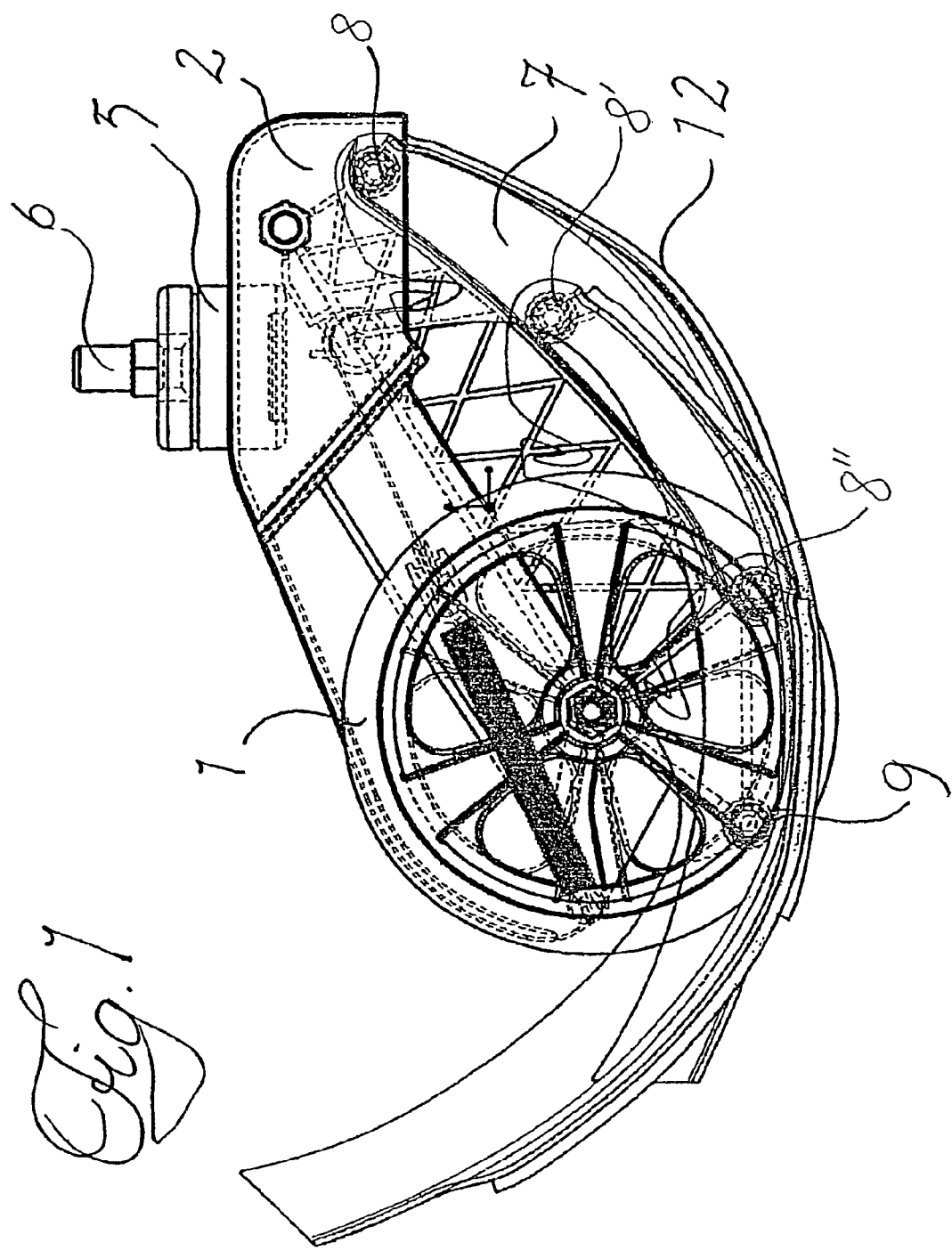

| | | | |
|---|---|---|---|
| 4,467,496 A * | 8/1984 | Gregg | 16/18 B |
| 6,224,068 B1 * | 5/2001 | Eguchi et al. | 280/5.2 |
| 6,357,765 B1 * | 3/2002 | Heien | 280/5.26 |
| 6,609,719 B1 * | 8/2003 | Heien | 280/5.26 |
| 6,752,400 B1 * | 6/2004 | Nakatsukasa et al. | 280/5.2 |
| 2004/0135326 A1 * | 7/2004 | Palmers et al. | 280/5.2 |

FOREIGN PATENT DOCUMENTS

| | | | |
|---|---|---|---|
| DE | 4040283 A1 * | 8/1991 |
| GB | 2188597 A * | 7/1987 |
| JP | 5-178001 * | 5/1993 |
| JP | 10-297206 | 11/1998 |

* cited by examiner

ARRANGEMENT IN A WHEEL LIFTING MECHANISM

The present invention relates to an arrangement according to the pre-characterising part of claim 1.

In many contexts small rollers or wheels are used on trolleys, machine frames, Zimmer frames etc. Small wheels or rollers take up little space, are relatively strong and not least can help to keep costs low. So-called pivot wheels to facilitate steering and turning are also known.

One prerequisite for the use of the aforementioned small rollers or wheels, however, is that the underlying surface is flat. Door thresholds and kerb edges constitute obstacles that are difficult to surmount. Since the pushing force is often applied high up, there is a risk of the wheeled arrangement overturning. Even though the wheels used on Zimmer frames, for example, are relatively large, their capacity to roll up kerb edges, for example, is poor. The person using the Zimmer frame then has to manage to tilt it backwards far enough to allow its front wheels to mount the kerb edge. It is not as awkward for the trailing wheels, since the natural movement in pushing the Zimmer frame forwards also lifts these wheels up. In order to get the front wheels up, however, the handle of the Zimmer frame has to be drawn backwards and downwards, which is an unnatural movement for a person using the Zimmer frame as support. Not only Zimmer frames have this problem, but also cleaning trolleys, wheel chairs, serving trolleys and shopping trolleys etc.

U.S. Pat. No. 3,239,872, DE 4040283 A and JP 10297206 A, for example, already disclose wheel lifting mechanisms of the aforementioned type, which are all fairly similar to one another in that the element used to bring about the wheel lifting is only rotatably mounted. This means that the mechanism requires a relatively large overall height and despite this requires a relatively large pushing force in order to negotiate a raised obstacle.

The object of the present invention is to provide an improved wheel lifting mechanism and this is achieved in that the mechanism has the characteristic features specified in the characterising part of claim 1.

Further advantages and characteristics of the invention are set forth in the dependent claims and the following description of a preferred example of an embodiment, which is illustrated in the drawing attached. In this drawing FIG. 1 shows a side view of a wheel lifting mechanism according to the invention, and with three different positions of a lift-producing element, FIG. 2*a*–2*f* show a side view of the wheel lifting mechanism in various positions when negotiating an obstacle, FIG. 3 shows the wheel lifting mechanism in FIG. 1, FIG. 4 in diagrammatic form shows how various inclinations are obtained in negotiating obstacles of different height, and FIG. 5 shows the moving principle of the wheel lifting mechanism in FIG. 1.

The wheel lifting arrangement shown in the drawing interacts with pivot wheels comprising two wheels or rollers 1 arranged on a common axle 3, which is fixed to a chassis 4. Also forming part of the chassis is a casing 2, which at a front end accommodates a bearing housing 5 having a shaft 6 projecting vertically upwards, which is in turn fixed to the object that is to be moved, such as the front, largely vertical legs of a Zimmer frame, for example. An inclined element 7 is displaceably supported in relation to the chassis 4. From its elevated end the underside 13 of the element 7 initially slopes down steeply and then more shallowly towards a bottom point directly above the point of contact of the wheel 1 with the underlying surface. The element 7 is furthermore displaceably mounted, which is achieved by means of a front roller 8 supported in elements and a rear roller 9 supported in the chassis 4. The roller 8 is designed to roll on a race 10 on the underside of the chassis 4 and the roller 9 on a race 11 on the inner upper side of the element. On its downward-facing surface the element 7 is provided with a friction-enhancing coating 12, of rubber for example, which may also be ribbed. A spring 13 is furthermore fixed to the chassis 4 and is designed by means of split castors 14, 15 and a cord 16 in the element 7 to tension this towards its upward and forward home position. The fact that the spring 13, throughout the entire movement of the element 7, is anchored to the element 7 situated between the rollers 8, 9 means that the element 7 will be held fast by the spring 13 with the rollers 8, 9 in contact with the respective races 10, 11. Moreover, a relatively short spring movement is obtained despite a long working stroke between the element 7 and the chassis 4.

FIG. 1 shows three different relative positions between the chassis 4 and the element 7. In order to show these more clearly the various positions of the roller 8 have been marked 8, 8' and 8" respectively. These positions correspond to the positions shown in FIGS. 2*a*, 2*c* and 2*d* respectively, as will be explained below.

Figure 2:
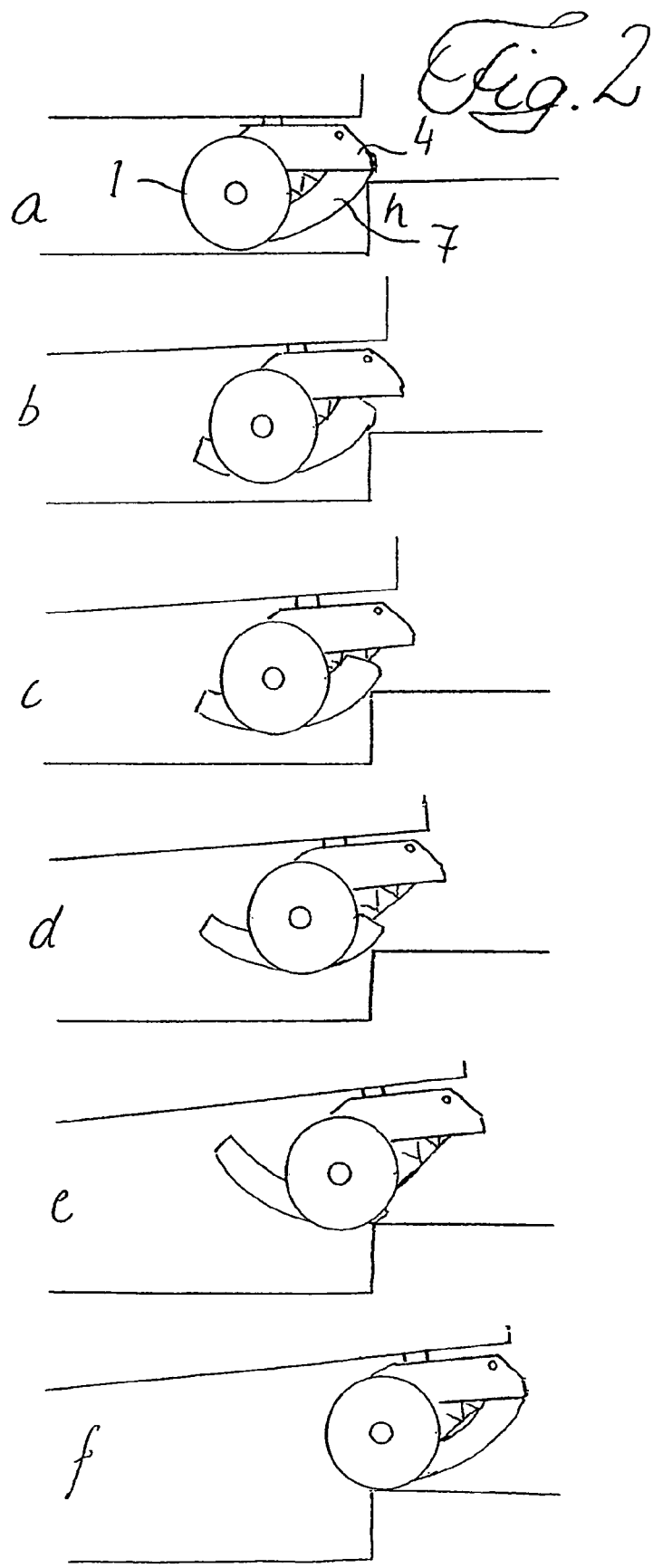
Figure 3:
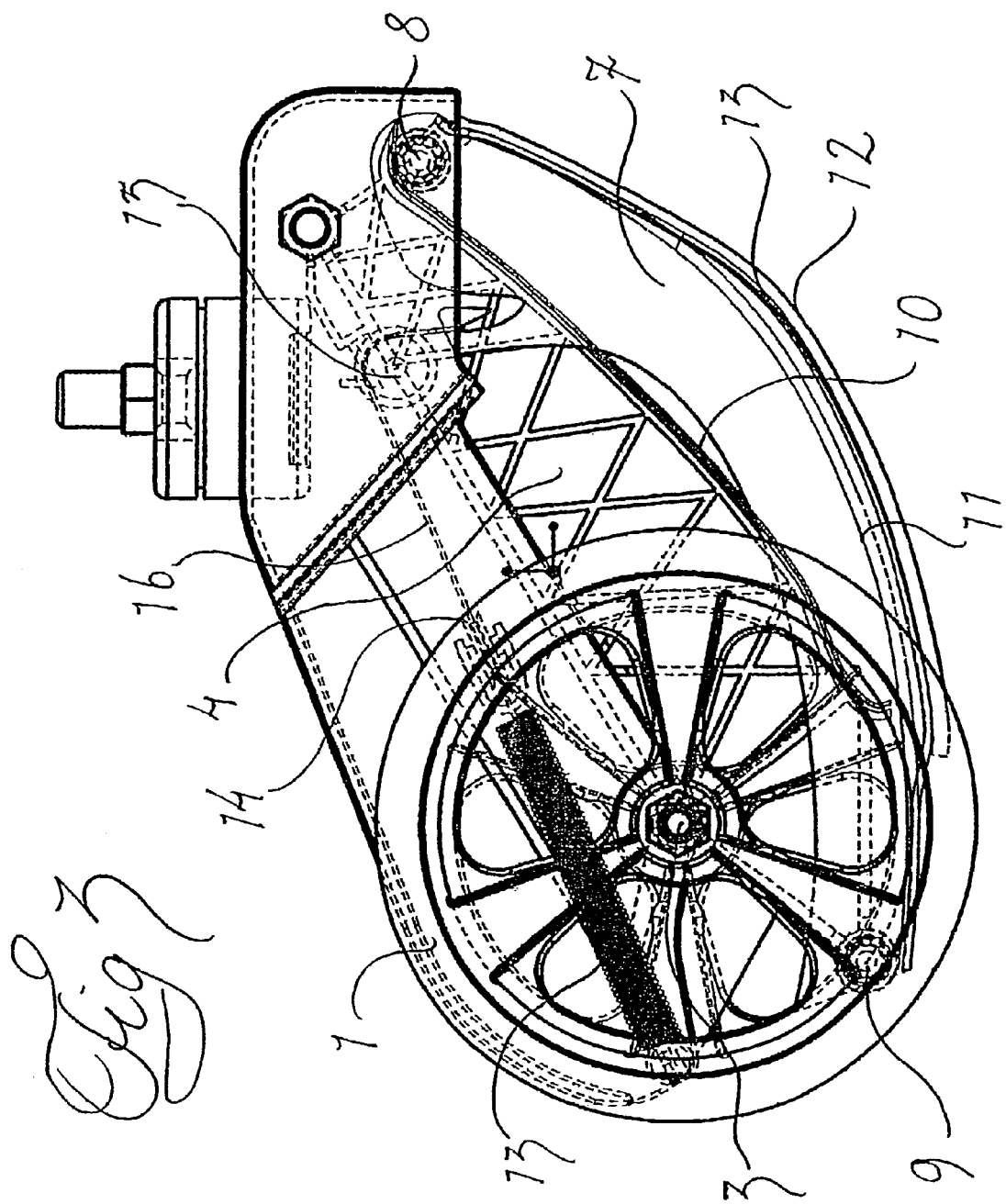

FIG. 2*a* illustrates how the element 7 of the wheel lifting mechanism according to the invention, which is in its home position in relation to the chassis 4, encounters an obstacle h and in so doing comes to a halt. The chassis 4 and the unit such as a Zimmer frame carried by the chassis continue in the direction of movement (to the right in the figure). FIGS. 2*b*–2*d* show different stages during the lifting sequence. In FIG. 2*e* the wheel 1 once more has contact with the obstacle h, which means that the element 7, through a displacing movement in relation to the chassis 4, returns to its home position, that is to say the position shown in FIG. 2*a*.

When the wheel lifting mechanism according to the invention encounters an edge, the coating 12 of the element 7 comes first into contact with the edge. Under a continuing forward movement of the wheel lifting mechanism, the chassis 4 slides forwards (in relation to the element 7) whilst the chassis 4 and hence also the wheels are lifted upwards by the interaction between the rollers 8, 9 and the races 10, 11. Ultimately, the chassis 4 has moved to such an extent that the wheels 1 come into contact with the edge and begin to roll thereon. As a result the element 7 is released and the spring 13 is drawn forwards into its home position (see FIGS. 2*a*–2*e*).

Figure 4:
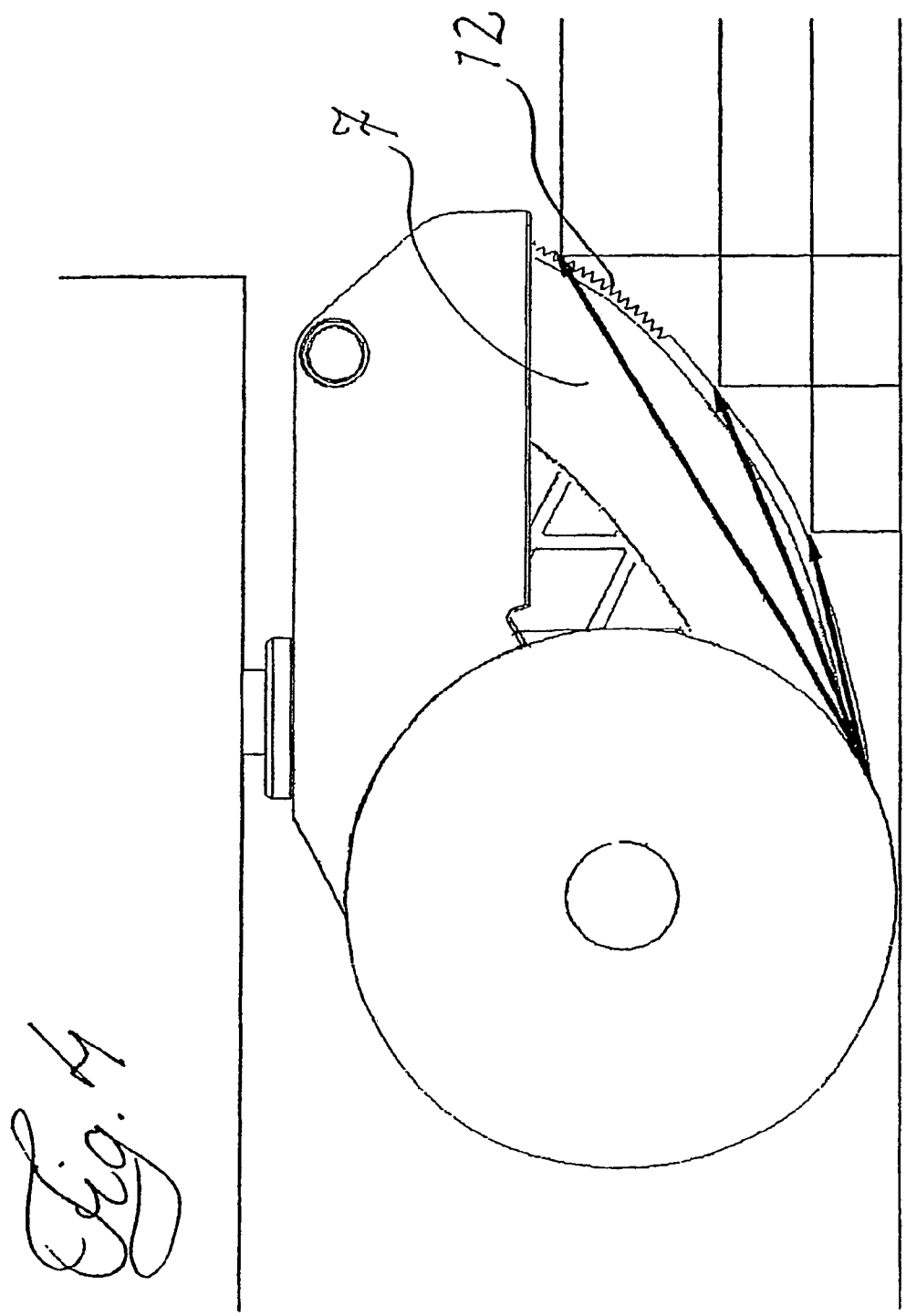
Figure 5:
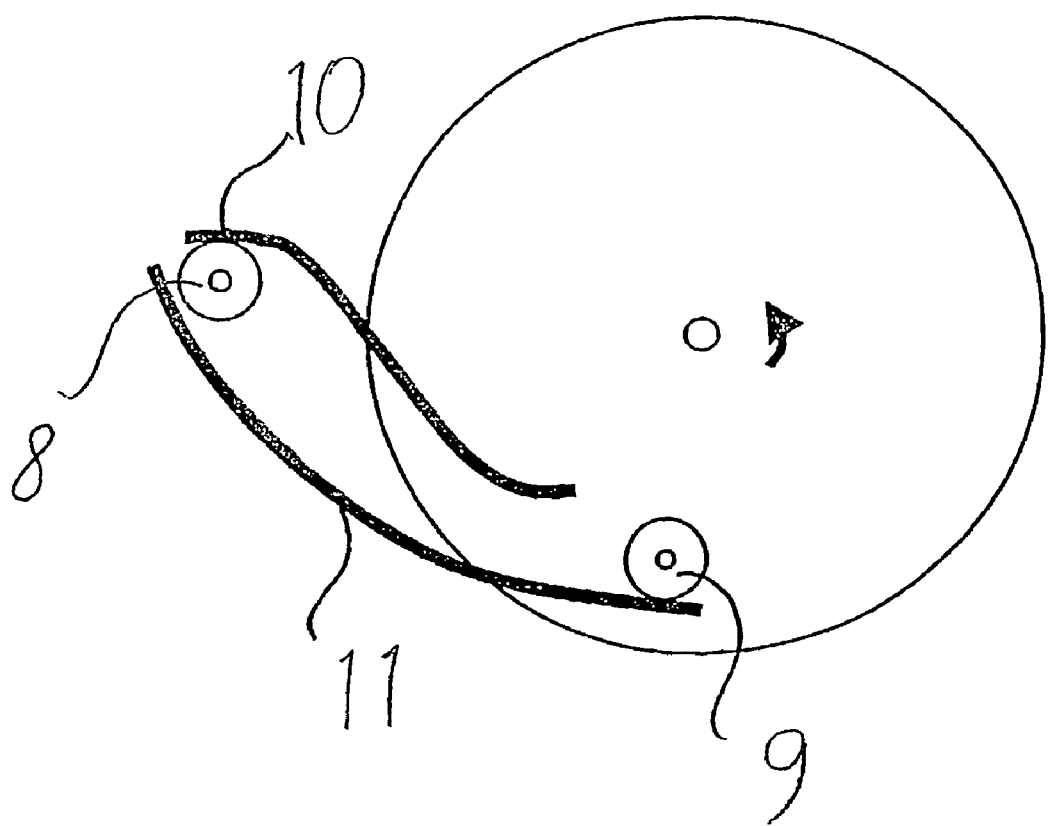

It can be seen from FIG. 4 how obstacles of various heights come into contact with the element 7. Its downward-facing edge or surface, that is to say the one that comes into contact with the obstacle, has a shape such that (in the home or rest position) it has a slight inclination closest to the wheel, which then becomes ever steeper as it progresses upwards and forwards. Even low obstacles therefore strike the element relatively far forward. The steering of the element relative to the chassis can well be described as partially a displacing movement by the roller 8, which is supported in the element 7, along the race 10 and partially a rotational movement around the roller 8. The rotation results from the fact that roller 9 continuously bears on the race 11 throughout the displacing movement. This description of the movement affords the opportunity to describe how all points on the element 7 move in relation to the chassis 4. Of particular interest are the points which come into contact with obstacles, for in the wheel lifting this point remains stationary, which means that the movement of the element 7 relative to the chassis 4 at this point also describes the movement of the chassis 4 over the obstacle. Lower obstacles, which encounter the element 7 lower down, give a larger radius for the rotational movement, which means that its vertical component increases as the obstacle diminishes and is subtracted from the vertical component of the displacing movement. This means that low obstacles also impart a long displacing movement to the chassis 4 before the wheel takes over. In other words, a lower rise and thereby a comfortable negotiation of the obstacle is achieved for obstacles of low to medium height, which may thereby become virtually imperceptible.

Instead of using two wheels each situated either side of the element 7, it is also feasible to arrange one element on either side of a centrally arranged wheel, which also affords the advantage that the two elements can more readily manoeuvre the wheel lifting mechanism for negotiating a kerb edge at right angles, for example. Furthermore it is possible to arrange the leading edge of the element a fraction in front of the swivel axis of the wheel lifting mechanism, since when the wheel loses its contact with the ground the arrangement will be immediately swivelled towards a position at right angles. This can also be achieved by a single central element, provided that this is sufficiently wide.

According to an alternative embodiment (not shown), there is only one wheel 1 and one element 7, these being arranged in tandem with coincident centre lines.

The arrangement according to the invention can also be used, after certain design modifications, to cushion the descent from a kerb edge by allowing the rear end of the element to jut out somewhat behind the wheel. When the wheel then rolls over the edge, the element catches the edge and gives a softer lowering of the wheel.

The element 7 can, like the entire wheel lifting mechanism, be composed of pressed sheet metal parts, die cast aluminium or injection moulded plastic, and the rollers 8, 9 bearing against the races 10, 11 may be ball bearings, roller bearings or slide bearings.

It may be noted that the two races may but do not necessarily have to be circular races. The element may furthermore be positively guided in some other way, even one involving the use of two springs.

The design of the two races offers great freedom of choice in so far as the obstacle-clearing movement is concerned, as is exemplified by FIG. 5. In FIG. 5 the race 11 is curved and the lower roller 9 supported in the wheel arrangement rests against the inside of the race 11. At the upper end of the element 7 the roller 8 supported therein is in contact with the race 10 in the chassis 4. This race, as will be seen from this embodiment, is slightly S-shaped, with the result that when coming up against an obstacle, the incipient lifting movement is slight, before then progressively increasing to a maximum value and then diminishing again in proximity to the rear end position. In this case the movement when negotiating an obstacle will be initiated and concluded very gently and almost imperceptibly.

A straight movement over an obstacle is achieved if the race 10 is slightly convex towards the element 7. The simplest from a purely design standpoint is naturally a normal curve 10, but this presupposes that the application will allow the movement to become steeper the more the vehicle inclines in negotiating the obstacle.

By arranging the downward-facing surface 12 of the element 7 and the race 11 on the inside thereof so that they are not altogether parallel, the free movement of the wheel, that is to say the height through which the wheel lifts the vehicle over obstacles, which is determined by where the element delivers the obstacle over to the wheel, can be varied for different obstacle heights.

The invention claimed is:

1. Arrangement in a wheel lifting mechanism designed to lift at least one wheel (1) running on an underlying surface so that it is capable of negotiating an obstacle (h) rising above the underlying surface, the arrangement comprising an element (7) which is formed with a contour convexly curved towards the underlying surface and is moveably supported in relation to the axle of the wheel (1), and which is designed, when the contour of the element (7) engages with the obstacle (h), to bring about the said lifting of the wheel (1) as the element (7) is rotated about its point of engagement with the obstacle (h), wherein the arrangement comprises a chassis (4), to which the wheel axle is firmly connected, and that between the chassis and the element (7) there is an operative connection designed, when the element (7) engages with the obstacle (h), to allow the chassis (4) firstly to undertake lifting of the wheel (1) from a home position of the element (7) during a displacing movement relative thereto in the direction of movement of the wheel (1), and secondly to bring about a return to the home position once the wheel (1) has been lifted to the level of the obstacle (h) and that the operative connection between the element (7) and the chassis (4) comprises a first race (11) remote from the upper side of the element (7) and having a profile corresponding to the contour, and a second race (10) facing the first race (11) and connected to the chassis (4), a first member (8) fixed to the element (7) and designed in the home position to bear against the front part of the second race (10) and to be moved backwards along this during the lifting, a second member (9) fixed to the chassis (4) and designed in the home position to bear against the rear part of the first race (11) and to be moved forwards along this during the lifting, and a sprung third member (13), acting between the element (7) and the chassis (4) and designed to bring about a return to the home position after the lifting.

2. Arrangement according to claim 1, wherein the said first and second member (8, 9) is a slide bearing.

3. Arrangement according to claim 1, wherein the said first and second member (8, 9) is a bearing.

4. Arrangement according to claim 1, wherein the said third, sprung member (13) is a helical coil spring.

5. Arrangement according to claim 1, wherein the convexly curved surface of the element facing the underlying surface is provided with a friction-enhancing coating (12), for example one of ridged rubber.

6. Arrangement according to claim 1, wherein a wheel (1) is provided on both sides of the element (7).

7. Arrangement according to claim 1, wherein the second race (10) is curved in an S-shape.

* * * * *